(12) United States Patent
Bergqvist

(10) Patent No.: US 7,040,884 B2
(45) Date of Patent: May 9, 2006

(54) APPARATUS AND PROCESS FOR FORMING PLASTIC LAMINATED PANELS

(75) Inventor: Tonny Bergqvist, Marcochydore (AU)

(73) Assignee: Euretech International Pty Ltd., Maroochydore (AU)

( * ) Notice: Subject to any disclaimer, the term of this patent is extended or adjusted under 35 U.S.C. 154(b) by 0 days.

(21) Appl. No.: 10/503,181

(22) PCT Filed: Jan. 31, 2003

(86) PCT No.: PCT/AU03/00101

§ 371 (c)(1),
(2), (4) Date: Dec. 21, 2004

(87) PCT Pub. No.: WO03/064132

PCT Pub. Date: Aug. 7, 2003

(65) Prior Publication Data

US 2005/0095307 A1 May 5, 2005

(30) Foreign Application Priority Data

Jan. 31, 2002 (AU) .......... PS0225

(51) Int. Cl.
*B23B 19/00* (2006.01)

(52) U.S. Cl. .......... 425/123; 425/127; 425/100; 249/83; 249/95; 249/187.1; 264/46.5; 264/46.7

(58) Field of Classification Search .......... 425/100, 425/4, 123, 127; 249/83, 95, 170, 187.1; 264/46.5, 46.7
See application file for complete search history.

(56) References Cited

U.S. PATENT DOCUMENTS

| | | | |
|---|---|---|---|
| 4,012,186 A | 3/1977 | Ramazzotti et al. | |
| 4,298,323 A | 11/1981 | Haydt, Jr. | |
| 5,021,108 A * | 6/1991 | Bergqvist | 156/79 |
| 5,129,975 A * | 7/1992 | Easterle et al. | 156/77 |
| 5,182,118 A | 1/1993 | Hehl | |
| 5,797,546 A * | 8/1998 | Reed et al. | 239/280.5 |

FOREIGN PATENT DOCUMENTS

| | | |
|---|---|---|
| EP | 0 483 541 | 5/1992 |
| JP | 06-087136 | 3/1994 |
| WO | WO 89/00496 | 1/1989 |

* cited by examiner

*Primary Examiner*—Robert Davis
*Assistant Examiner*—G. Nagesh Rao
(74) *Attorney, Agent, or Firm*—Fish & Richardson P.C.

(57) ABSTRACT

A system for manufacturing foamed plastics laminated panels at a high volume is disclosed. Press modules include a pair of opposed spaced open frame members with longitudinal raised sections attached to perpendicular supports. The open frame members move relative to one another, support respective panel outer skin layers; and recieve therebetween edge sealing members of a predetermined thickness. A spacing between the open frame members and a hinge is adjustable to move a first open frame member relative to a second frame member. Clamps retain the open frame members in a predetermined space relationship, and when actuated, forms a mould cavity defined by the outer skin layers and edge sealing members supported by the open frame members. An inlet introduces an a liquid foamable plastics material into the moulded cavity, and a delivery system delivers liquid reactants in predetermined proportions to a selected mould cavity formed in a selected press module.

Figure 1:
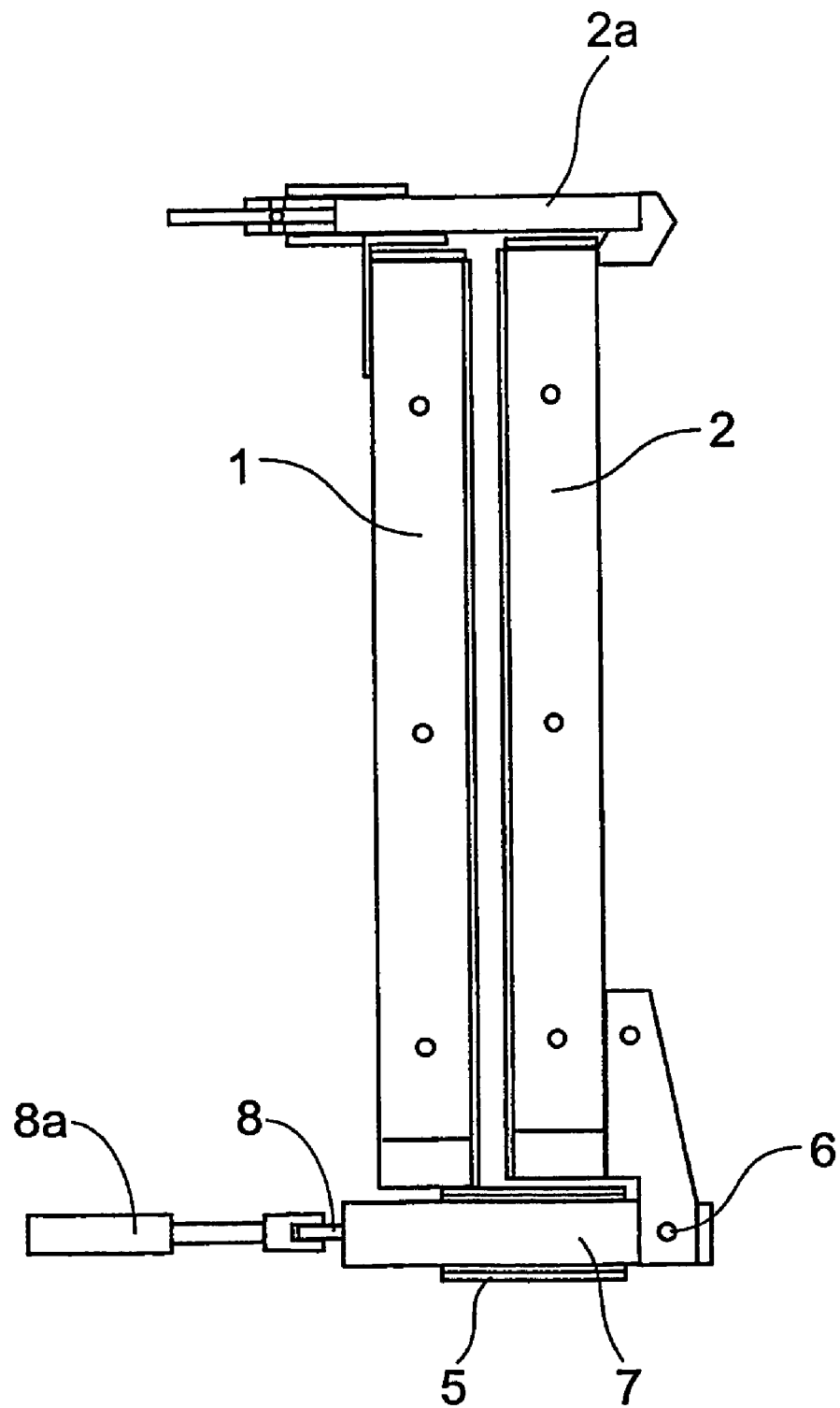

11 Claims, 5 Drawing Sheets form a mould cavity. The
APPARATUS AND PROCESS FOR FORMING PLASTIC LAMINATED PANELS

FIELD OF THE INVENTION

THIS INVENTION is concerned with the cost effective, high volume manufacture of laminated panels having a core of cellular plastics material and an apparatus for the manufacture of such panels. In particular, the invention is concerned with the manufacture of modular building panels of differing sizes and configurations.

Throughout the specification reference is made by example to panels having a core formed from a liquid foamable polyurethane resin. It should be understood however that the invention concerns any liquid foamable plastics material capable of solidifying to form a stable core material to which one or more outer skins are adhered.

BACKGROUND

Lightweight panels having cellular plastics cores sandwiched between durable outer skins of sheet plastics, metal, timber, cementitious materials, and the like have found favour as thermal insulation members in cold rooms, cold storage warehouses and building structures located in adverse climates. Typically such insulating panels comprise a core of open or closed cell polystyrene or polyurethane foam.

WO 89/00496 filed by the applicant provides a process and apparatus for producing laminated panels. Whilst this process and apparatus are effective in producing high quality foamed plastic laminated panels for modular building structures, it does not provide for high volume production due, in part, to the inability to readily alter the size of the panels. The presses of WO 89/00496 had large heavy steel planar platens to withstand the internal pressures. These steel platens required that the panels be held in the press for longer periods, as the decreased temperature of the platens acted as a heat sink, which along with the substantial cooling effect of the adiabatic expansion of the blowing agent, slowed the cross-linking reaction, and thus extending the mould cycle. The steel platen surfaces also required preheating in cold weather in order to minimise their interference with the cross-linking reaction.

Attempts to speed up the process of WO 89/00496 resulted in panels having uneven insulation properties, due to variations in foam density as a function of ambient temperature. The areas of the panels with less insulation may lead to the formation of condensation. It is therefore important to have close control of reaction rates, otherwise variable quality of the panel results, which is unacceptable in building materials.

The arrangement of the injection mould presses in WO 89/00496 required that the second outer skin layer be placed on the movable steel platen surface and under actuation of the clamp join with the seals to form a mould cavity. The technique of adding the second skin layer limited the length of the moulds to 15 m or less.

The regulated phasing out of the use of reactants, such as Freon 11 (the blowing agent used in the production of polyurethane), has required a move to more environmentally acceptable halogenated hydrocarbons.

These halogenated hydrocarbons require additional clamping pressures to be used to ensure the press remains closed during the expansion of the blowing agent in the cross-linking reaction.

OBJECT OF THE INVENTION

An object of the invention is to, either in whole or part, ameliorate one or more disadvantages of the prior art or provide a commercially viable alternative.

STATEMENT OF THE INVENTION

One aspect of the invention there is provided an apparatus for manufacture of foamed plastics laminated panels having;
an array of press modules, each press module comprising;
a pair of opposed spaced frame members movable relative to one another;
adjustment means to adjust spacing between said frame members;
a hinge to allow a first frame member to move relative to a second frame member;
one or more clamps to retain, in use, said frame members in a predetermined spaced relationship;
two outer skin layers, in use, spaced and located on the opposing inner surfaces of the respective frame members; sealing members located, in use, between said frame members and two outer skin layers, to define a mould cavity between said opposed outer skin layers when said clamp is actuated,
at least one inlet to introduce into said mould cavity a liquid foamable plastics material:
respective reservoirs of liquid reactants, for producing a foamable plastic; and
delivery means to deliver liquid reactants in predetermined proportions to respective mould cavities.

Preferably the presses are of varying size. Suitable the largest presses within the array are situated furtherest from the respective reservoirs of liquid reactants.

The sealing members located at the respective longitudinal sides or edges of the outer skin layers are preferably formed from aluminium or stainless steel, having two spaced curved protrusions running along both edges of the face directed towards the mould cavity, which retain rubber tubing, or the like. In use, the respective outer skin layers compress the rubber tubing and rest on the curved protrusions to create, under pressure, sufficient seal to prevent leakage of the foamable plastic from the mould. The face of the sealing members between the two curved protrusions may also be contoured between the two protrusions, to form a corresponding profile in the resultant laminated foam panel. Similar sealing members may be used at the shorter ends or sides of the outer skin layers and/or may be contoured to the profile of the outer skin layers.

The press member may include means to support said press member in an upright position. Preferably means are provided to support said press member in an inclined position.

The adjustment means may comprise any suitable means to selectively adjust spacing between opposed frame members. Suitably said adjustment means comprises means to move hinge brackets to which a frame member is hingedly attached. The adjustment means may comprise a mechanically adjustment means actuated by mechanical, electrical or fluid powered actuating means.

The clamp may comprise a plurality of clamp members located along one or more peripheral edges of said frame members. The clamp means may comprise a plurality of clamp members operable individually, in groups or collectively.

The delivery means preferably comprises; a proportioning pump; high pressure hoses; and an injection gun.

The injection gun is a pressurised gun arrangement adapted to receive reactants through high-pressure hoses from the respective reactant reservoirs, via a proportioning pump which meters delivery of the reactants to the injection gun. The injection gun, having a basic a gun shaped manifold comprises;

an air trigger valve within the main body, which can be opened with depression of a trigger;

a mixing chamber, for receiving reactants through hoses fitted by screw threads to the outer surface of the gun and in communication with the mixing chamber;

a nozzle like projection extending from the mixing chamber to external to the gun shaped manifold, having a screw thread at the distal end of the nozzle like projection;

an outer U shaped sleeve having an aperture in its base to accommodate the nozzle like projection;

an inner tubular sleeve, wherein one end is closed, the closed end having an aperture which, in use, screws onto the nozzle like projection at one end, and provides another screw thread internal to the open end of the tubular sleeve;

an elongated delivery nozzle containing a static mixer, engaged with the inner screw thread of the tubular sleeve.

In another aspect of the invention is provided an apparatus to fit an elongated nozzle extension to an injection gun, the elongated nozzle extension comprising;

an outer U shaped sleeve having an aperture in its base to accommodate nozzle like projection provided on an injection gun;

an inner tubular sleeve, wherein one end is closed, the closed end having an aperture which, in use, screws onto the nozzle like projection at one end, and provides another screw thread internal to the open end of the tubular sleeve;

an elongated delivery nozzle containing a static mixer, engaged with the inner screw thread of the tubular sleeve.

DETAILED DESCRIPTION OF THE INVENTION

In order that the invention may be more fully understood reference is now made to a preferred embodiment described with reference to the accompanying drawings in which:—

Figure 2:
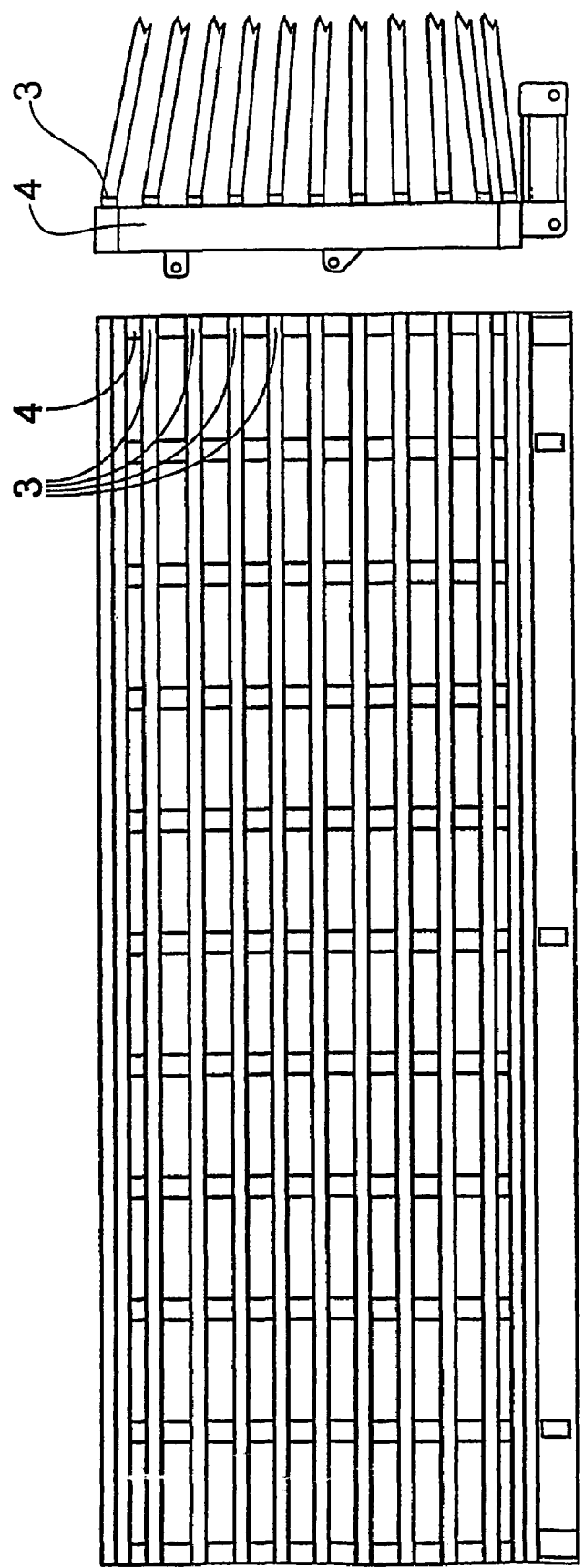

FIG. 1. is a schematic drawing of a press module;

FIG. 2. is a schematic drawing of the grid like surface of the frame members used in the presses.

Figure 3A:
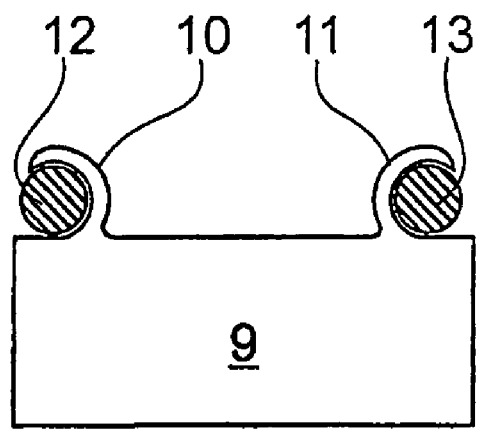

FIG. 3A. is a schematic drawing of a cross section of a mould sealing member.

Figure 3B:
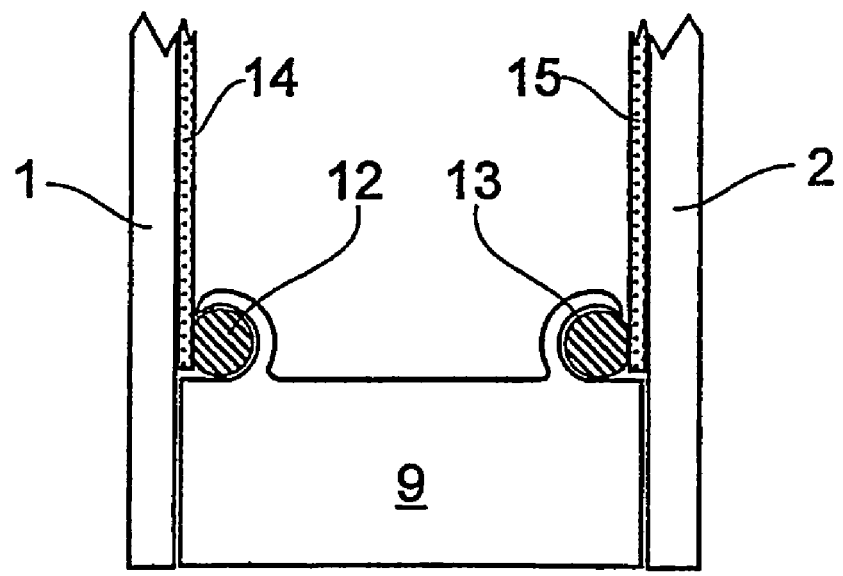

FIG. 3B. is a schematic drawing of a cross section of a mould sealing member showing the placement of the outer skin layers and frame members, in use.

Figure 4:
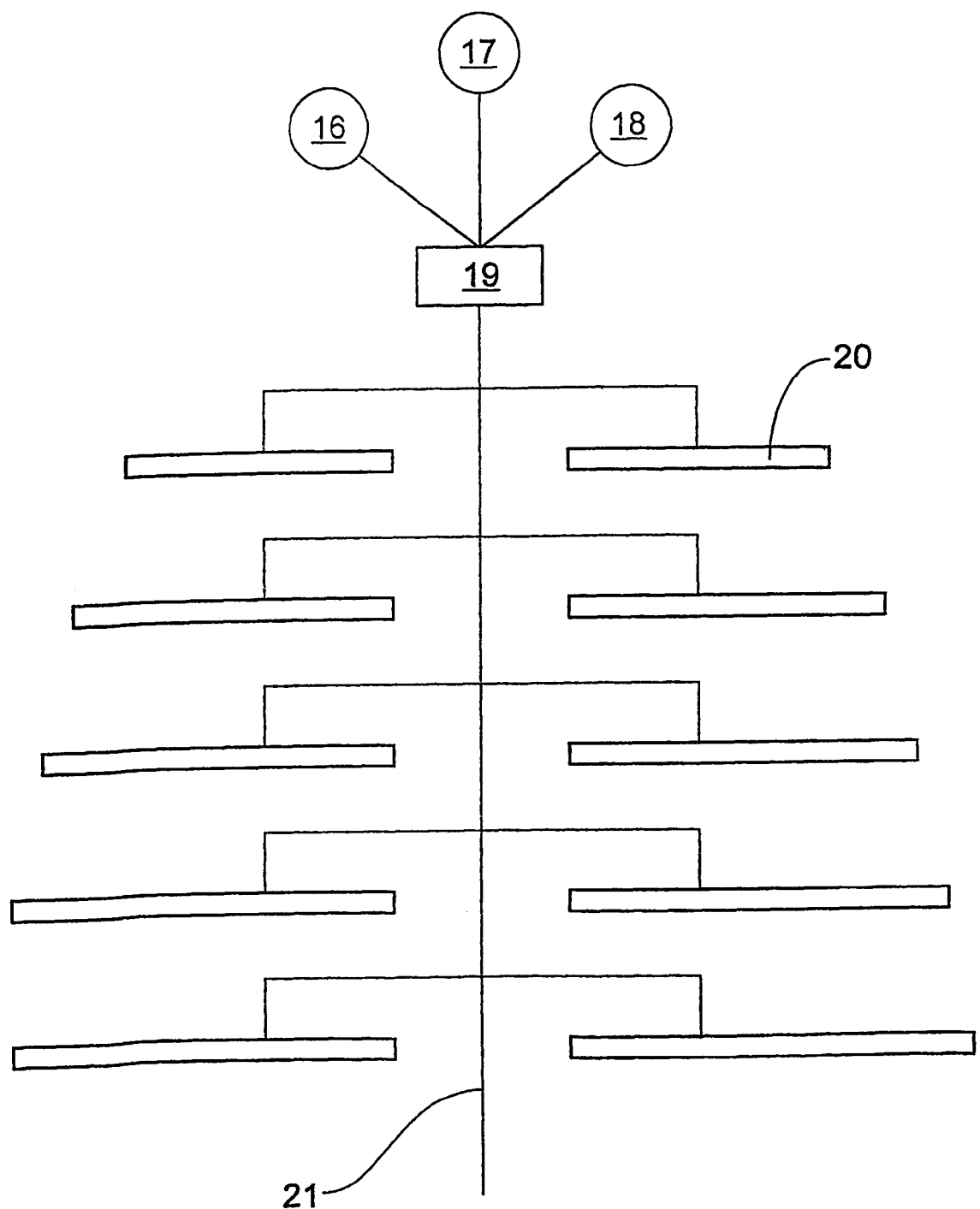

FIG. 4. is a schematic drawing of an overhead perspective of a factory lays employing the apparatus of the invention.

Figure 5:
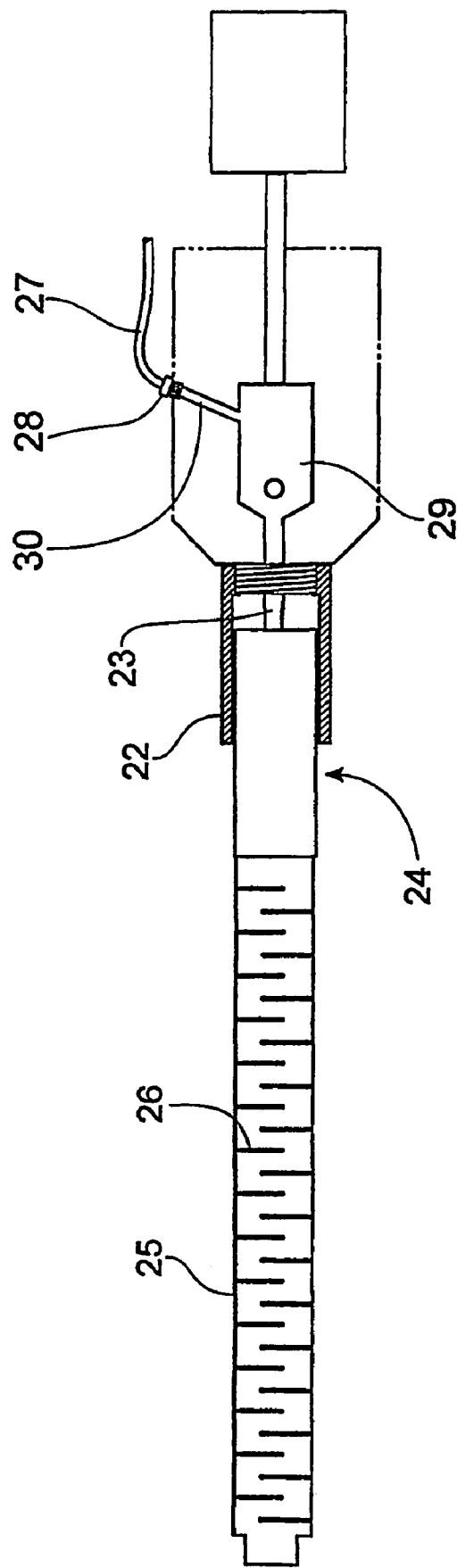

FIG. 5. is a schematic drawing of the injection gun.

FIG. 1. is a press module comprising a fixed frame member 1 and a movable frame member 2. Frame members 1 and 2 comprise a number of spaced longitudinal raised sections 3 attached to a number of perpendicular supports 4, as shown in FIG. 2. Preferably the longitudinal raised sections 3 and perpendicular supports 4 are formed from box sectioned metal tubing. The longitudinal raised sections 3 are preferably spaced to accommodate the hills and valleys of a profiled outer skin layer, such as contoured sheet metal.

Fixed frame member 1 is mounted on a base 5 and movable frame member 2 is hingedly mounted above pivots 6 on support members 7 slidably located in base 5. On the free ends of support members 7 are brackets 8 contectable to an adjustment mechanism, such as a hydraulic ram, 8*a* to adjust the spacing between frame members 1 and 2. Clamp members 2*a* are connected to the top of the press to extend between the upper portions of frame members 1 and 2. The clamp members 2*a* may be operated individually, in groups or collectively.

The mechanism for retracting position and extending position of the movable frame member is similar to that described in WO 89/00496 at page 9 and in FIGS. 3*a* and 3*b*, incorporated herein by reference.

The press module shown in FIGS. 1 and 2 suitably has a frame member dimension of 3.3–18 m in length and 1 metre in width. The adjustment means enables the spacing between the frame members to be adjusted from between approximately 10 mm and 200 mm, although the resultant panels that are likely to be produced would typically have a thickness of between 50 and 100 mm.

Intermediate members may be employed to act as additional spacers located between the outer skin layers. Additional structural supports, such as inserted channelling or metal sections to facilitate building, may also be located between the outer skin layers prior to moulding.

Typically the fixed frame member is positioned on an inclined, which may be adjusted to meet particular circumstances.

In use the press module or assembly is opened and a sheet of outer skin facing material (such as, fibrecement sheeting, plywood, reconstituted timber sheeting, flat steel sheet, profiled steel sheet, rigid plastics sheet or flexible metal or plastic films or various combinations of outer skins) is supported against the fixed frame member 1. Mould sealing members are then spaced about the periphery of the sheets of skin material. These mould sealing members are removable seals formed from aluminium.

The mould sealing members 9 are placed along the longitudinal sides of the first outer skin layer have two curved protrusions 10 and 11 running along each edge of the face of the mould places toward to mould cavity, shown in cross section in FIG. 3A. Rubber tubing 12 and 13, or the like, is retained within the curved protrusions 10 and 11. With the sealing members in place a second outer skin layer is placed on top of the sealing members. In use the rubber tubing 12 and 13 is compressed by both of the outer skin layers 14 and 15 and under pressure, from the respective frame members 1 and 2, forms a seal to prevent leakage of the foamed plastic from the mould, illustrated in cross section in FIG. 3B. The mould sealing members 9 may, if required, include a profiled shape to facilitate edge-to-edge joining of finished panels.

The mould sealing members placed at the ends, or short edges, of the outer skin layers are contoured to fit the shape of the outer skin layer. The end mould sealing members may also have additional contouring to allow for end to end joining of panels.

After the mould sealing members 9 are positioned, the second outer skin layer is placed on top of the mould sealing members. The press is then closed and the clamp assembly is actuated to retain the frame members 1 and 2 at a predetermined spacing, determined by the thickness of the mould sealing members and the thickness of the adjustment assembly.

As per WO 89/00496 an upper or side edge sealing member (not shown) includes one or more gas evacuation ports and an injection port or inlet(s) communicating with the hollow or cavity formed between the outer skin layers. A nozzle of a polyurethane injection gun is then inserted into the injection port and a predetermined volume of liquid polyurethane and foaming agent is injected into the cavity. The port is then sealed and the polyurethane mixture is allowed to expand to fill the cavity. When the polyurethane foam core has cured sufficiently the press is opened by releasing the clamp assembly and the actuating the thickness adjustment assembly to "crack" any air tight seal which may form between the outer skins and respective frame members. The hydraulic ram assembly associated with the movable frame member is then retracted to open the press to enable removal of the finished panel. Any removable mould closure members are then removed from the peripherial edges of the panel.

FIG. 4. is a schematic drawing of a possible layout for a factory employing the process of the invention. Reservoirs 16, 17 and 18 store the liquid reactants. The liquid reactants are gravity feed into a delivery means.

The delivery means comprises a proportioning pump 19, high-pressure hoses, and an injection gun. The proportioning pump 19 delivers predetermined amounts of the liquid reactants to the respective press modules 20 via high-pressure hoses. The high-pressure hoses are supported on an overhead gantry 21. The gantry 21 is adapted to allow the hoses to extend to all presses 20 within the array, shown by the dotted line, in FIG. 4. The end of the hoses is attached to an injection gun. The injection gun is shown in detail in FIG. 5. Preferably the high-pressure hoses are approximately 60 m long. Typically the reactants are gravity feed into the proportioning pump at a rate of 8 L per 10 secs.

An array of press modules or presses, preferably up to 50, is arranged on a factory floor in a similar manner to that shown in FIG. 4. Each press within the array is fitted with a first skin layer, typically fibrecement sheeting or sheet metal, such as profiled galvanised aluminium sheeting. The first skin layer is placed between two longitudinal mould sealing members and the second outer skin laid on top of the mould sealing members, placed under pressure and reactants injected into the mould cavity.

Preferably each press has its own hydraulic control bank to allow for closing of the second frame member. These hydraulic banks could be remotely operated. Preferably the array is organised in such a manner that the larger panels to be manufactured are futherest from the reactant storage area and the proportioning pumps.

The injection gun is attached to the end of the high-pressure hoses via screw threads. A first air hose provides air for the air valve trigger, to place the injection gun under pressure. Another hose carries the polyol and blowing agent mixture, whilst a third hose carries the di-isocyanate from the reactant reservoirs. An example of a hose attachment is provided in FIG. 5, wherein a reactant hose 27, is attached via a nut and screw arrangement 28 to be in communication with the mixing chamber 29 through channel 20. The injection gun is inserted into a port in the upper seal of the mould. The reactants enter a mixing chamber at the point where the reactant hoses attach to the gun. Upon depression of the trigger of the injection gun the reactants proceed through an elongated nozzle containing a static mixer prior to being delivered to the mould or mould cavity.

Commercially available injection guns have a fragile short nozzle which whilst can be readily extended, such extensions lead to expensive breakages of the shorter nozzle. To overcome this problem the inventors have developed an interlocking protective sleeve arrangement, to provide better stability for the elongated nozzles required for such injection moulding. The inventors have adapted commercially available injection or delivery guns, shown in FIG. 5, by adding a U shaped outer sleeve 22, having an aperture (not shown) in the base to accommodate the short nozzle 23 of the injection gun, screwing in an inner sleeve 24 having two screw threads one to engage with the short nozzle and the other adapted to receive a screw thread of an elongated nozzle 25. The elongated nozzle 25 preferable contains a static mixer 26, to ensure that all the reactants are thoroughly mixed during delivery into the mould.

The delivery of reactants to the injection gun can be predetermined and metered so as sufficient reactants are delivered to fill each mould in turn. This will allow for automation of the process in providing a delivery system of precise reactants for each panel within the array dependent on size of the panel to be made and position within the array.

The injection of reactants into the mould typically takes 10 to 15 seconds, using the delivery gun of the invention. Processes of the prior art typically required up to 1 minute for the injection of reactants. WO 89/00496 describes in significant detail the problems of uneven delivery of the reactants to the mould and the formation of voids etc. The faster delivery of the reactants further addresses the problems of void formation, as there is less chance of uneven curing occurring and therefore variations in insulations properties within a panel.

After which the injection gun is removed from the mould, the port sealed and polyurethane allowed to form or cure, typically the residence time for the mould is 15 minutes. This is a substantial saving in time from prior art methods, which typically required curing times of 30 minutes or more. The time saving in cure reaction time is attributed to the removal of steel platens, which interfere with the efficiency of the cross-linking reaction, as discussed above.

In addition, the presses of the prior art, having flat steel platen surfaces required heating of the platens, when external temperatures where low, such as 15–16° C. This step of the prior art processes is eliminated with the use of the frame members of the presses of the current invention, further reducing operating and capital costs.

After curing for each panel is completed, the presses are opened and the laminated panel removed. As soon as the panel is removed the presses can be prepared for making another panel.

To allow for high volume manufacturing it can be appreciated that all the presses would initially be set up with the necessary seals and outer skin layers, depending on the final use of the panels, put under pressure and the respective moulds injected. As the panels, in turn, cure, they are removed from the press and the press fitted with seals and new skin materials for production of subsequent panels on a cyclic basis. It can be appreciated that this semi-continuous method of injection, in addition to the new frame members of the presses allows for high volume of manufacturing.

Particular advantage of the materials handling processes involved in the invention, i.e. the placement of fibrecement sheeting in moulds and removal of the panels can be done with minimum of personnel and minimum of specialised handling equipment. In the example discussed above a plant of that nature might employ one person to handle and mix the chemicals, one person to inject liquid components into moulds and two persons to load and unload the mould presses, as will be apparent to a person skilled in the art. None of the personnel would need to be highly skilled.

Preferably said press member may be adapted for end abutment with one or more press members to form laminated panels of predetermined length greater than the length of the frame member of an individual press member, or adapted to make a two or more shorter panels with the frame member capable of receiving a number of sets of end seals at predetermined lengths.

It would be appreciated that this process can be further modified to employ the use of robotics or additional automation to enhance the cost savings through a reduction in the number of staff required to ensure the process runs efficiently.

Structural panels made in accordance with the invention are considered to be particularly suitable for construction of buildings in areas prone to earthquakes and/or cyclones, or monsoons, due to the panels greater flexibility in comparison to concrete panels, whist providing high levels of structural strength and integrity.

Throughout the specification the aim has been to describe the preferred embodiments of the invention without limiting the invention to any one embodiment or a specific collection of features.

The invention claimed is:

1. A manufacturing system comprising:
   a plurality of press modules, each press module comprising:
   (a) a pair of opposed spaced open frame members having a plurality of spaced longitudinal raised sections attached to a plurality of perpendicular supports and configured to move relative to one another and support respective panel outer skin layers and receive therebetween edge sealing members of a predetermined thickness;
   (b) an adjustment mechanism configured to selectively adjust spacing between said open frame members,
   (c) a hinge configured to allow a first member to move relative to a second frame member,
   (d) one or more clamps configured to retain, in use, said open frame members in a predetermined spaced relationship such that when actuated from a mould cavity defined by said outer skin layers and edge sealing members supported by said open frame members, and
   (e) at least one inlet configured to permit introduction of a liquid foamable plastics material into said mould cavity;
   a plurality of respective reservoirs configured to hold liquid reactants; and
   a delivery system configured to deliver the liquid reactants in predetermined proportions to selected mould cavity formed in a selected press module.

2. The manufacturing system of claim 1, wherein the press modules are configured to produce panels of varying length and width.

3. The manufacturing system of claim 2, wherein large press modules are situated remotely from said respective reservoirs.

4. The manufacturing system of claim 1, wherein two or more of said edge sealing members comprise aluminium or stainless steel, said two or more edge sealing members including at least two spaced curved channels running longitudinally along opposed edges of an inner face directed towards the interior of said mould cavity, said channels configured to retain compressible tubular seals, in use, compressible against respective inner surfaces of outer skin layers to prevent leakage of foamable plastics from said mould cavity prior to curing.

5. The manufacturing system of claim 4, wherein said inner face of at least one of the edge sealing members between said channels is contoured, to form a complementary edge profile in a resultant laminated foam panel.

6. The manufacturing system of claim 1, which further comprises support mechanism to support said press modules in an upright and/or inclined position.

7. The manufacturing system of claim 1, wherein said adjustment mechanism is actuated by a mechanical, electrical or fluid powered actuating mechanism configured, to move and adjust hinge brackets to which a frame member are attached.

8. The manufacturing system of claim 1, wherein said one or more clamps comprise a plurality of clamp members located along one or more peripheral edges of said open frame members.

9. The manufacturing system of claim 8, wherein said one or more clamps comprise a plurality of clamp members operable individually, i groups or collectively.

10. The manufacturing system of claim 1, wherein said delivery system comprises:
    a proportioning pump;
    high pressure hoses; and
    an injection gun, wherein said injection gun comprises:
    (a) an air trigger valve within a main body configured to open y actuation of a trigger,
    (b) a mixing chamber configured to receive the liquid reactants through a plurality of hoses attached to said injection gun and in fluid communication with the mixing chamber,
    (c) a nozzle in fluid communication with said mixing chamber, said nozzle configured to be surrounded by an outer tubular sleeve member,
    (d) an inner sleeve member configured to be secured by respective screw threads to said nozzle internally of said outer tubular sleeve member, and
    (e) an elongate delivery nozzle configured to be secured by a screw thread internally to said inner sleeve member.

11. The manufacturing system of claim 10, wherein said elongated delivery nozzle includes a static mixing device therein.

* * * * *